United States Patent [19]
Kuwabara et al.
[11] Patent Number: 5,045,243
[45] Date of Patent: Sep. 3, 1991

[54] METHOD FOR DRY FRACTIONATION OF FATS AND OILS

[75] Inventors: Yuji Kuwabara, Wakayama; Hiroshi Hidaka, Sakai; Kazuhito Asahara, Sennan; Nobuo Sagi, Sakai, all of Japan

[73] Assignee: Fuji Oil Company, Limited, Osaka, Japan

[21] Appl. No.: 370,042

[22] Filed: Jun. 22, 1989

[30] Foreign Application Priority Data

Jul. 1, 1988 [JP] Japan ................................ 63-165213
Sep. 16, 1988 [JP] Japan ................................ 63-233318

[51] Int. Cl.[5] ............................ C09F 5/10; C11B 3/00

[52] U.S. Cl. ................................ 260/428.5; 260/428; 260/412.2; 260/410.7

[58] Field of Search .................. 260/410.7, 412.2, 428, 260/428.5

[56] References Cited

U.S. PATENT DOCUMENTS 4,161,484 7/1979 Van den Berg .................. 260/428.5
4,360,536 11/1982 Keuning et al. .................... 260/428

*Primary Examiner*—Jose G. Dees
*Assistant Examiner*—Deborah D. Carr
*Attorney, Agent, or Firm*—Wenderoth, Lind & Ponack

[57] ABSTRACT

A method for dry fractionation of a fat or oil wherein a non or less-laurin fat or oil is cooled and then fractionated into a solid fraction and a liquid fraction, said method comprising cooling the fat or oil in an apparatus having cooling means to crystallize it in a desired crystallization degree, then crushing it physically to fluidize it, and then pressing or filtering it to fractionate into the crystalline solid fraction and the liquid fraction.

7 Claims, 3 Drawing Sheets

FIG. 1A
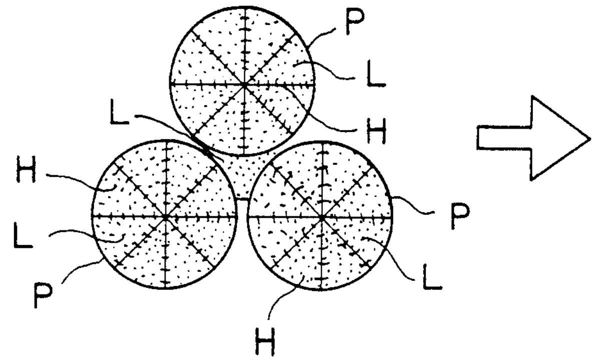
FIG. 1B
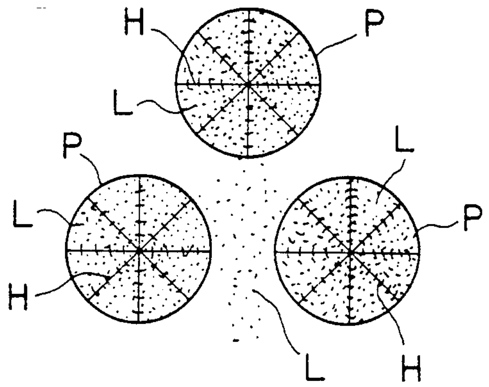
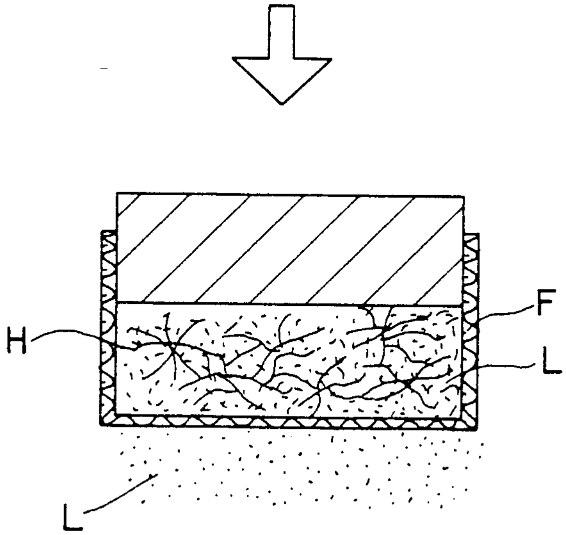
FIG. 1C

METHOD FOR DRY FRACTIONATION OF FATS AND OILS

FIELD OF THE INVENTION

The present invention relates to a method for fractionation of fats and oils by utilizing the difference in melting points of fatty constituents. Particularly, it relates to an improvement of dry fractionation.

BACKGROUND OF THE INVENTION

As methods for fractionation of an oily substance composed of a mixture of liquid fats and oils, liquid waxes and other similar components by utilizing the difference in melting points of respective components, there have been known, for example, (1) organic solvent fractionation using an organic solvent such as acetone, hexane or the like, (2) detergent fractionation using a surfactant, (3) dry fractionation, i.e., winterization by cooling and (4) sweating.

Among these, the method (1) is advantageous because fractionation can be carried out precisely. However, on the other hand, since a flammable solvent should be used, this is dangerous and requires high production cost. The method (2) has inferior precision of fractionation and its product has inferior quality in comparison with those of the method (1). In addition, separation of a fat or oil from an aqueous solution containing a surfactant and treatment of waste water containing a surfactant are troublesome. The method (3) requires expensive crystallization tank facilities. In addition, productivity, fractionation efficiency and quality of a product are inferior to those of the above two methods. Application of the method (4) is limited to certain kinds of fats and oils. That is, it is employed for removing a wax but is not suitable for fractionation of fats and oils.

The present invention relates to an improvement of the above method (3). Usually, the above method (3) is carried out by lowering the temperature of a refrigeration medium stepwise to deposit crystals slowly in a vertical crystallization tank equipped with a stirrer. In this method, crystals in the form of a slurry are discharged from a bottom part of the tank after crystallization and then pressed or filtered with a belting press or filter press to fractionate into a solid fraction, i.e., crystal fraction and a liquid fraction in a post step. In general, this can be operated under such conditions that a crystallization degree is relatively low such as less that 10 to 30% by weight as the yield of a crystal fraction after pressing based on the total yield of the product. However, when a crystallization degree becomes higher, for example, more than 30%, particularly, 40 to 70% by weight as the yield of a crystal fraction after pressing based on the total yield of the product, a crystalline mass completely loses fluidity and crystals can hardly be discharged from the crystallization tank unless crystallization is carried out with stirring.

Accordingly, in order to obtain crystals in a high yield, it is necessary to carry out crystallization with stirring gently. In this case, the resulting crystals are liable to include a liquid fraction, which results in remarkable deterioration of quality of the crystals. Further, a heavy-duty stirrer is required for stirring, which results in a high production cost.

Due to these reasons, a conventional method is operated in a relatively low crystallization degree such as less than 10 to 30% by weight as the yield of a crystal fraction after pressing based on the total yield of the product. However, a lower melting point fraction can not be sufficiently concentrated because of the low crystallization degree and, thereby, the resulting product has inferior quality.

In the case of fractionation of a non-laurin fat or oil according to the above method (3), it has been proposed to add crystal seeds to a molten fat to accelerate crystallization (Japanese Patent Publication No. 15759/1981 and Japanese Patent Laid Open Publication No. 101197/1985). However, when a crystallization degree becomes 40 to 60% by weight as the yield of a crystal fraction after pressing based on the total yield of the product, such a method is hardly operable because the resulting crystalline mass loses fluidity and is hardly discharged from a crystallization tank.

Under these circumstances, the present inventors have intensively studied means for providing fluidity to a crystalline mass having less fluidity formed in winterization to obtain an improved industrially applicable method for dry fractionation which is operable even in a high crystallization degree. As the results, it has been unexpectedly found that, particularly in non or less-laurin fats and oils such as palm oil, an oily mass formed by crystallization even in a high crystallization degree can be converted into a creamy slurry having a self-fluidity by crushing and kneading the mass with a suitable shearing force, physical vibration or the like, and that the slurry thus treated has remarkably superior filtering characteristics in comparison with an untreated crystalline mass. Further, it has been found that, when a non or less-laurin fat or oil is cooled with a gaseous or liquid refrigeration medium such as air or water to crystallize slowly, fine dendrites of a high melting point fraction grow and a macroscopically globular crystalline agglomerate wherein an amorphous lower melting point fraction is included in the fine crystalline structure of the dendrites is formed, and that such a crystalline agglomerate can be readily separated into a crystal part being rich in the high melting point fraction and an oily part being rich in the low melting point fraction by simply applying a shearing force. Furthermore, it has been found that the globular crystalline agglomerates become a slurry having such a low viscosity that it can be transported by a pump.

OBJECTS OF THE INVENTION

The main object of the present invention is to provide an improved method for dry fractionation of fats and oils, particularly, non or less-laurin fats or oils.

This object as well as other objects and advantages of the present invention will become apparent to those skilled in the art from the following description with reference to the accompanying drawings.

BRIEF EXPLANATION OF DRAWINGS

FIGS. 1A to 1C are schematic diagrams illustrating the principle of the present invention.

SUMMARY OF THE INVENTION

Figure 2:
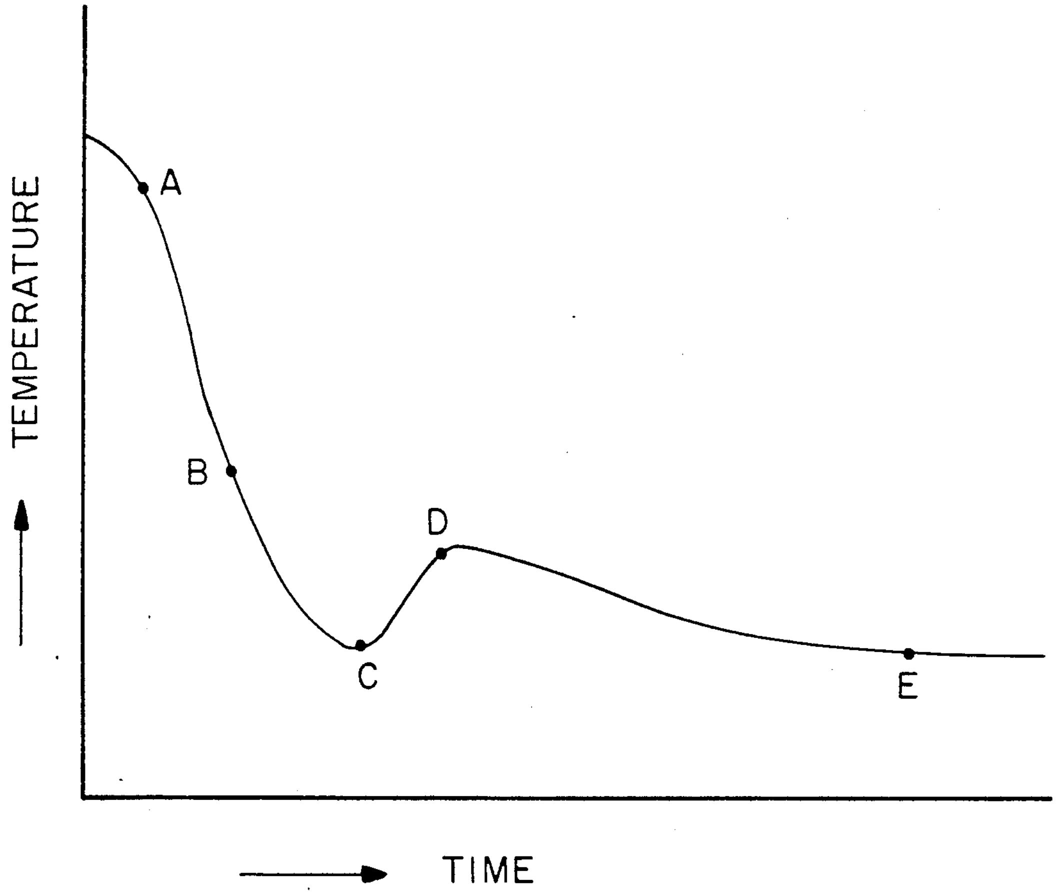
FIG. 2 is a graph illustrating a cooling curve according to the method of the present invention.

According to the present invention, there is provided a method for dry fractionation of a fat or oil wherein a non or less-laurin fat or oil is cooled and then fractionated into a solid fraction and a liquid fraction, said method comprising cooling the fat or oil in an apparatus having cooling means to crystallize it in a desired crystallization degree, then crushing it physically to fluidize it, and then pressing or filtering it to fractionate into the crystalline solid fraction and the liquid fraction. In a preferred embodiment, a uniformly molten non or less-laurin fat or oil is allowed to stand in a heat transfer container and cooled with a gaseous or liquid refrigeration medium such as air or water to crystallize it in a desired crystallization degree and the crystalline agglomerates thus obtained are crushed and pressed to fractionate into a crystalline solid fraction and a liquid fraction.

DETAILED DESCRIPTION OF THE INVENTION

Non or less-laurin fats and oils

The non or less-laurin fats and oils to be fractionated in the present invention are those containing not more than 10% by weight of $C_{12}$ saturated fatty acid residue. Examples of the non or less-laurin fats and oils include animal fats and oils (e.g., tallow, lard, milk fat, etc.), vegetable fats and oils (e.g., palm oil, soy bean oil, rapeseed oil, shea fat, sal fat, etc.) and their interesterified oils, hardened oils and fractionated hardened oils and the like. However, the present invention is not limited to these fats and oils.

Cooling

Cooling means used in the present invention are not limited to a specific one. However, in view of utilization of the advantageous effect of crushing and pressing characteristics, it is of importance that the crystals grow in the form of dense needles or dendrites to form a large agglomerate having particle size of more than several tens micrones. Usually, such crystals can be obtained by allowing the fat or oil to stand and crystallizing under considerably slow cooling conditions. For example, in the case of palm oil, after melting at a temperature of about 50 to 60° C., it is crystallized slowly by cooling with a gaseous or liquid refrigeration medium such as air or water at a temperature of 10 to 20° C. to deposit globular dendrites having particle size of about 10 to 200 μm. The crystalline agglomerate is easily fluidized by crushing, and pressing characteristics are extremely improved.

As a refrigeration medium, a gaseous refrigeration medium such as air is preferred because it has a relatively small heat transfer coefficient and, therefore, it is suitable for slow crystallization to deposit large crystals of the fats and oils. Particularly, a cold gas such as cold air is advantageous to make a cooling rate at the linear part of a cooling curve steady as described hereinafter. However, a liquid refrigeration medium having a relatively large heat transfer coefficient such as water can be also used by carefully controlling temperature and flow rate so as to lower a cooling rate sufficiently before deposition of crystals to make the linear part of a cooling curve steady.

The crystallization degree may be up to about 70% by weight, preferably, 20 to 60% by weight as the yield of the crystal fraction after pressing based on the total yield of the product.

In practice, usually, a non or less-laurin fat or oil to be fractionated is placed in a container being relatively shallow such as a vat, tray or the like and cooled slowly with cold air or water or a liquid refrigeration medium at a controlled temperature. In the case of palm fractionated oil, preferably, the oil placed in a shallow tray made of stainless steel is cooled under conditions of an initial temperature of not lower than 50° C., a cold air temperature of 10 to 15° C., depth of liquid of not less than 10 mm and a cooling rate from 35° C. to 20° C. of 0.1 to 2.0° C./min.

The cooling conditions are further illustrated in detail with reference to FIG. 2 which is a typical cooling curve of a palm fractionated oil. The term "cooling rate" used herein means the average cooling rate between A and B of the cooling curve of the fat or oil to be treated as shown in FIG. 2. When this rate is held constant, the curve becomes linear or substantially linear. This region is corresponding to that wherein fine crystals of the high melting point fraction of the fat or oil to be treated form primary crystal nuclei. When the temperature drops below this region and reaches the lowest point C, the temperature of the product rises temporary up to the point D due to the heat of crystallization and then drops slowly toward the point E which is substantially equal to the temperature of cold air. Then, the curve runs parallel with abscissa which represents time. Crystals grow slowly even after passing the point D and, during this time (aging period), separation between the crystalline high melting point fraction and amorphous low melting point fraction further proceeds (in the case of palm oil, A and B are corresponding to 35° C. and 20° C., respectively).

The above cooling conditions are generally applicable to not only palm fractionated oil but also other non or less-laurin fats and oils. However, particular conditions are varied depending upon various factors such as a particular non or less-laurin fat or oil to be treated, material and size of vat or try, initial temperature and desired properties of the fractionated oil. Therefore, in the case of fractionation of other non or less-laurin fats and oils, optimum conditions should be experimentally determined.

In this respect, it is of importance that, firstly, the fat or oil to be treated should be homogeneously molten by raising temperature to liquefy it sufficiently. That is, if fine crystals of a high melting point fraction is present in the fat or oil to be treated, such crystals act as crystallization nuclei to accelerate crystallization, which results in loss of fluidity of a crystalline mass as described above. For example, the above palm fractionated oil becomes clear liquid at about 30° C. However, the liquid is in an ununiform state wherein high melting point molecules such as 1,3-dipalmito-2-olein, tripalmitin and the like are dispersed in the liquid as microscopical crystals. Therefore, it is necessary to heat the liquid until a uniform liquid is obtained. By the way, the amount of tripalmitin is very small and it is assumed that tripalmitin is present in the form of mixed crystals or eutectic crystals. Therefore, in practice, heating at 65.5° C. which is the melting point of its β crystal form or higher is not required and, usually, heating at about 50° C. is sufficient.

The crystals thus formed are macroscopically globular crystalline agglomerates wherein an amorphous low melting point fraction is included in the fine structure of dendritic high melting point fraction as described above, and microscopically ununiform agglomerates.

Crushing

Crushing can be carried out by using, for example, a mixer, an auger, a kneader or the like. Crushing breaks agglomerates of dendrites physically but should not break the crystalline structure thereof. During passing through such an apparatus, mechanical action of a shearing force, impact force, tensile force and/or frictional heat is applied to the oily agglomerates to divide and crush them and to form a slurry wherein small oily masses mainly composed of a high melting point fraction are dispersed in a partially molten liquid low melting point fraction. Such a slurry can be transported by a pump as it is.

When this step is omitted, in the case of a high crystallization degree, the resulting crystalline mass can not be transported by a pump. Further, when the resulting cake is subjected to pressing in the next step, separation of the liquid fraction from the cake becomes insufficient and, therefore, an iodine value (hereinafter sometimes abbreviated as I.V.) of the solid fraction is increased in spite of a low iodine value of the liquid fraction.

Pressing

The above slurry of a non or less-laurin fat or oil is then filtered or pressed and separated into a solid fat or oil of high melting point fraction and a liquid fat or oil of low melting point fraction. Particularly, a batchwise filtration apparatus is preferred and, for mass production, it is preferred to use a filter press having plural filtering chambers arranged in parallel, especially, a so-called variable-volume or membrane type filter press wherein a filtering.chamber is pressed by static pressure with a diaphragm made of pressure rubber. In this type of filtration apparatus, each filtering chamber is thin such as several tens mm in thickness and has good heat transfer efficiency. Therefore, the temperature in the filtering chamber can be readily controlled. In addition, even if the volume per each chamber is small, a large amount of a non or less-laurin fat or oil such as several tons to several tens tons of the non or less-laurin fat or oil can be treated at once and such a filtration apparatus is very suitable for practicing the present invention. However, the means for filtering or pressing is not limited to such a filtration apparatus and a suitable apparatus can be selected according to quality of the resulting product and raw fats and oils. For example, another filtration apparatus such as X-press filter, automat press, tubeless VC filter or piston press can be used.

Preferably, pressing is carried out at about the crystallization temperature of the crushed oily agglomerates.

FIG. 1 schematically illustrates the principle of the present invention. That is, a high melting point fraction (being rich in high melting point molecules) (H) in a fat or oil gradually grows in dendriform and forms a small oily masses (P) which includes low melting point fraction (being rich in low melting point molecules) (L). Then, a large amount of the small oily masses (P) are attached to each other with relatively weak binding force to form a large oily agglomerate (FIG. 1A). When a shearing force is applied thereto, the weak bonding between the small oily masses is broken and the large oily agglomerate is broken into the unit small oily masses (P), and the low melting point fraction (L) included between the small oily masses is firstly released. Then, the small oil masses (P) are in a state as if they lose a bonding cement and, thereby, fluidity can be provided (FIG. 1B).

Then, when they are filtered or pressed, the low melting point fraction (L) in the small oily masses (P) is extruded from the masses to the outside. Thus, they are separated into a crystalline high melting point fraction and a liquid low melting point fraction. The latter is discharged from a filtering chamber to the outside thereof through a filtering medium (F) (FIG. 1C).

Although the mechanism is unclear, the above phenomenon that a fat or oil is separated into a high melting point fraction and a low melting point fraction by crushing is peculiar to non or less-laurin fats and oils and, even if a laurin fat or oil such as palm kernel oil is subjected to crushing, it will never become a slurry state.

By the way, in the present invention, the size of crystals should be as large as possible so that the filtrate remained in a filter cake in the pressing step becomes as little as possible. The size of crystals mainly depends upon the number of crystal nuclei per unit volume and the crystallization degree. Particularly, the former is determined by the linear or substantially linear region of an initial stage of a cooling curve. When a cooling rate is faster, the number of crystal nuclei is increased and, as the result, it is difficult to form larger crystals. According to the present inventors finding, desired crystals can be obtained at a cooling rate of about 2.0° C./min. or lower. However, when a cooling rate is too low, the temperature of a fat or oil rises due to the heat of crystallization accompanying growth of crystals. Then, cooling becomes difficult and crystallization takes a long period of time. Accordingly, from the industrial viewpoint, the cooling rate is preferably not lower than 0.1° C./min.

As described above, according to the present invention, even a crystalline mass of non or less-laurin fats and oils obtained in a high crystallization degree can be fluidized by crushing so that it can be transported by a pump. Therefore, throughput capacity of crystallization and filtration apparatuses are improved. Thus, there can be provided a method for dry fractionation of an oily material having excellent workability and separation efficiency and, thereby, fractionation cost can be reduced.

The following Examples and Comparative Examples further illustrate the present invention in detail but are not to be construed to limit the scope thereof.

EXAMPLES 1 to 3 and COMPARATIVE EXAMPLE 1

A liquid fraction of palm oil (I.V.: 57.0) was cooled under the various cooling conditions as shown in Table 1 with cold air at 15° C.±0.5° C. Then, after crushing or without crushing, the resulting crystalline mass or agglomerates were pressed at pressure of 28 $kg/cm^2$ for one hour by using a small filter press having a frame thickness of 20 mm to fractionate into a solid fraction and a liquid fraction.

The cooling conditions and results are shown in Table 1.

TABLE 1

| Sample | Comparative Example 1 | Example 1 | Example 2 | Example 3 |
|---|---|---|---|---|
| Crushing | no crushing | crushing | crushing | crushing |
| Cooling rate (°C./min.) | 0.50 | 0.34 | 0.50 | 0.67 |
| Crystalliza- | 25 | 30 | 25 | 22 |

TABLE 1-continued

| Sample | Comparative Example 1 | Example 1 | Example 2 | Example 3 |
|---|---|---|---|---|
| tion time (hrs.) | | | | |
| Depth of tray (mm) | 32 | 50 | 32 | 32 |
| Sample weight (g) | 312 | 312 | 312 | 307 |
| Solid fraction | | | | |
| I.V. | 47.2 | 44.0 | 42.8 | 45.3 |
| Yield (%) | 45.3 | 42.2 | 36.3 | 46.1 |
| Liquid fraction | | | | |
| I.V. | 65.1 | 66.5 | 65.1 | 67.0 |
| Yield (%) | 54.7 | 57.8 | 63.7 | 53.9 |

As is clear from the above Table 1, in the sample of Example 2 wherein the crystalline agglomerates are subjected to crushing and kneading, the I.V. of the liquid fraction is the same as that of Comparative Example 1 wherein no crushing is carried out. However, the I.V. of the solid fraction of Example 2 is 4.4 lower than that of Comparative Example 1.

Further, as is clear from the results of Examples 1 and 3, even when the I.V. of the liquid fraction is higher, that is, even when the crystallization degree is higher, the I.V. of the solid fraction is lowered by the method of the present invention. In other words, pressing characteristics are improved.

Figure 3:
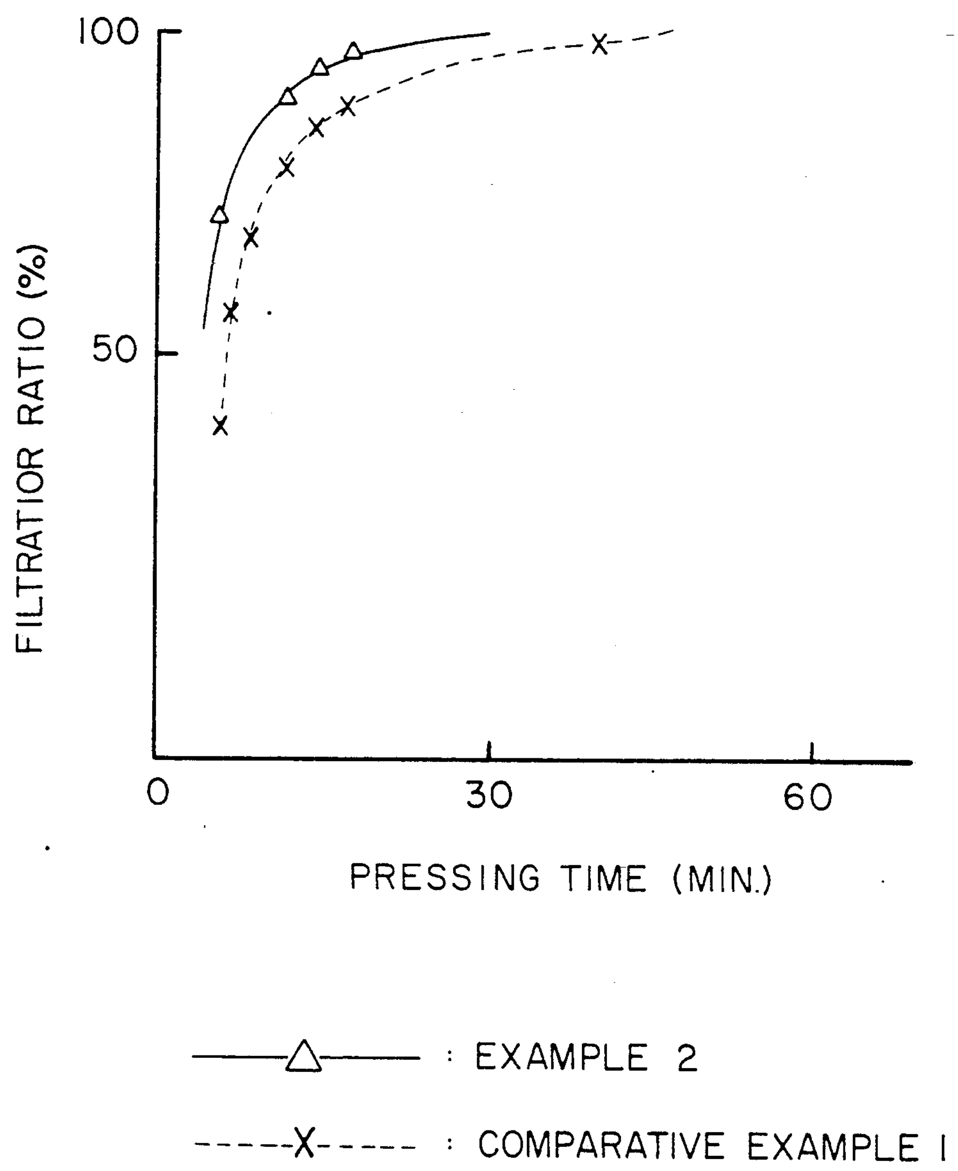
FIG. 3 is a graph illustrating the effect of the present invention on filtering characteristics.

In FIG. 3, there is shown a graph illustrating the change of the filtration ratio (%) of the samples of Comparative Example 1 and Example 2 with time. The filtration ratio is the ratio of the yield of the liquid fraction at certain time to the total yield of the liquid fraction. As seen from FIG. 3, the filtration in Example 2 can be carried out about twice faster than that in Comparative Example 1.

EXAMPLES 4 to 6

A liquid fraction of palm oil as used in the above was placed in various trays having different depth so that the initial cooling rate was varied in the range between 0.5 to 2.5° C./min. The resulting agglomerates were crushed, pressed and filtered and I.V. values of the resulting solid and liquid fractions were determined.

The results are shown in Table 2.

TABLE 2

| Sample | Ex. 4 | Ex. 5 | Ex. 6 |
|---|---|---|---|
| Cooling rate (°C./min.) | 0.5 | 2.0 | 2.5 |
| Crystallization time (hrs.) | 25 | 17 | 13 |
| Sample weight (g) | 312 | 312 | 310 |
| Solid fraction | | | |
| I.V. | 42.8 | 44.2 | 47.0 |
| Yield (%) | 36.3 | 37.9 | 45.7 |
| Liquid fraction | | | |
| I.V. | 65.1 | 64.8 | 65.4 |
| Yield (%) | 63.7 | 62.1 | 54.3 |

As is clear from Table 2, quality of the solid fraction (I.V.) is greatly influenced by the cooling rate. The preferred cooling rate is about 0.1 to 2.0° C./min.

EXAMPLES 7 and 8

Milk fat (I.V.:32.4) was cooled with cold air at 20° C. or 23° C. under the cooling conditions as shown in Table 3 (wind velocity: 2 to 3 m/sec.). Then, after crushing, the resulting crystalline mass or agglomerates were pressed at pressure of 10 kg/cm$^2$ for 10 min by using a small filter press having a frame thickness of 20 mm to fractionate into a solid fraction and a liquid fraction.

The cooling conditions and results are shown in Table 3.

TABLE 3

| Sample | Ex. 7 | Ex. 8 |
|---|---|---|
| Cold air temperature (°C.) | 23 | 20 |
| Cooling rate (°C./min.) | 0.3 | 0.3 |
| Crystallization time (hrs.) | 4 | 3 |
| Depth of tray (mm) | 30 | 30 |
| Sample weight (g) | 300 | 300 |
| Solid fraction | | |
| I.V. | 26.9 | 28.7 |
| Yield (%) | 22.2 | 46.6 |
| Liquid fraction | | |
| I.V. | 34.8 | 35.9 |
| Yield (%) | 77.8 | 53.4 |

What is claimed is:

1. A method for dry factionation of a fat or oil wherein a non or less-laurin fat or oil is cooled and then fractionated into a solid fraction and a liquid fraction, said method comprising cooling the fat or oil, by permitting it to stand in an apparatus having cooling means, with a gaseous or liquid refrigeration medium at a temperature of 10 to 20° C. at a cooling rate in a linear region of a cooling curve of 0.1 to 2.0° C./min. to crystallize it in a desired crystallization degree, then crushing it physically to fluidize it, and then pressing or filtering it to fractionate into the crystalline solid fraction and the liquid fraction.

2. A method according to claim 1, wherein the crystallization degree is 20 to 70% by weight as the yield of the crystalline solid fraction based on the yield of the total product.

3. A method according to claim 2, wherein the crystallization degree is 30 to 60% by weight as the yield of the crystalline solid fraction based on the yield of the total product.

4. A method according to claim 1, wherein oily agglomerates obtained by cooling are crushed by using an apparatus equipped with a physical kneading or crushing mechanism.

5. A method according to claim 1, wherein the gaseous refrigeration medium is air.

6. A method according to claim 1, wherein the liquid refrigeration medium is water.

7. A method according to claim 1, wherein pressing is carried out at about crystallization temperature of the crushed agglomerates.

* * * * *